(12) United States Patent
Mehnert et al.

(10) Patent No.: US 10,222,235 B2
(45) Date of Patent: Mar. 5, 2019

(54) POSITION DETECTOR CONFIGURABLE TO OPERATE IN AN AUTONOMOUS MODE OR NON-AUTONOMOUS MODE

(71) Applicants: Avago Technologies International Sales Pte. Limited, Singapore (SG); Walter Mehnert, Ottobrunn (DE); Thomas Theil, Feldafing (DE)

(72) Inventors: Walter Mehnert, Ottobrun (DE); Thomas Theil, Feldafing (DE)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 199 days.

(21) Appl. No.: 15/278,244

(22) Filed: Sep. 28, 2016

(65) Prior Publication Data

US 2017/0089724 A1  Mar. 30, 2017

(30) Foreign Application Priority Data

Sep. 28, 2015 (DE) .......................... 10 2015 218 647
Oct. 7, 2015 (DE) .......................... 10 2015 117 064

(51) Int. Cl.
*G01D 5/14* (2006.01)
*G01P 3/481* (2006.01)
*G01D 5/249* (2006.01)

(52) U.S. Cl.
CPC ............ *G01D 5/142* (2013.01); *G01D 5/145* (2013.01); *G01P 3/4815* (2013.01); *G01D 5/249* (2013.01)

(58) Field of Classification Search
CPC ........ G01D 5/142; G01D 5/249; G01D 5/145; G01D 5/2454; G01D 5/2455; G01D 5/14; G01P 3/4815; G01P 13/04; G01P 3/481; G01P 3/487; G01B 7/30; G01R 1/16; G01R 23/00; G06F 15/00
See application file for complete search history.

(56) References Cited

U.S. PATENT DOCUMENTS

| | | |
|---|---|---|
| 2006/0164077 A1 | 7/2006 | Mehnert et al. |
| 2010/0213927 A1 | 8/2010 | Mehnert et al. |
| 2011/0006757 A1* | 1/2011 | Mehnert ................ G01D 5/145 324/207.2 |
| 2011/0184691 A1* | 7/2011 | Mehnert ................ G01D 5/145 702/151 |
| 2013/0200883 A1* | 8/2013 | Mehnert .............. G01R 33/072 324/207.2 |
| 2013/0317761 A1* | 11/2013 | Mehnert ................ G01F 3/227 702/45 |
| 2014/0067301 A1* | 3/2014 | Mehnert ................ G01D 5/145 702/78 |
| 2015/0130450 A1* | 5/2015 | Gehringer ............. G01D 5/145 324/207.25 |

(Continued)

FOREIGN PATENT DOCUMENTS

DE    102004062448 A1    1/2006

*Primary Examiner* — Jay Patidar
(74) *Attorney, Agent, or Firm* — Sheridan Ross P.C.

(57) ABSTRACT

A position detector is disclosed that is capable of operating in an autonomous mode or non-autonomous mode. As an example, in the autonomous mode, the position detector is not supplied with external energy, but rather receives energy from a Wiegand module thereby enabling the position detector to obtain information about movement of an object.

11 Claims, 4 Drawing Sheets

(56) References Cited

U.S. PATENT DOCUMENTS

2015/0135852 A1\* 5/2015 Efimov .................. G01F 1/075
 73/861.78
2016/0033305 A1\* 2/2016 Mehnert ................ G01D 5/145
 324/207.18

\* cited by examiner

POSITION DETECTOR CONFIGURABLE TO OPERATE IN AN AUTONOMOUS MODE OR NON-AUTONOMOUS MODE

CROSS-REFERENCE TO RELATED APPLICATIONS

The present application claims the priorities of the German patent application no. DE 10 2015 218 647, filed Sep. 28, 2015, and of the German patent application no. DE 10 2015 117 064, filed Oct. 7, 2015, which are both incorporated herein by reference in their entirety.

FIELD OF THE INVENTION

The present invention relates to a position detector, a count sensor that is provided with such a position detector and an absolute position detector that is provided with the count sensor.

TECHNOLOGICAL BACKGROUND

In the state of the art, a position detector is known from the patent document DE 102 59 223 B3. The position detector disclosed therein comprises a Wiegand module as well as an additional sensor element, and is configured to detect a position of a rotating permanent magnet or of a rotating shaft that is provided with the permanent magnet.

The Wiegand module is composed of a Wiegand wire with a corresponding coil that is wound around the Wiegand wire, wherein the coil outputs a voltage pulse, if the rotating permanent magnet takes up a specific posture or position. The additional sensor element, which is supplied with the energy that is provided by the Wiegand module, is arranged such that it outputs either an output signal or no output signal as a function of the rotation direction of the permanent magnet after the determination of the voltage pulse, which allows an unambiguous inference (or conclusion) as to the position and rotation direction of the permanent magnet.

The information about the position of the north pole or the south pole of the permanent magnet is obtained from the polarity of the voltage pulse that is output from the coil of the Wiegand module.

In many application cases, a very high reliability is required, which cannot be provided by the position detector known from the state of the art for the reason that because in such a case, in which the additional sensor element provides no output signal, no such inference is possible about whether the permanent magnet or the shaft rotates in said one direction or whether the additional sensor element has a malfunction.

In addition, in the position detector known from the state of the art, it is not possible to eliminate impairments occurring due to noise fields (or interference fields), which is why beside the reliability also the operational safety (or operation reliability) is not sufficiently high.

SUMMARY OF THE INVENTION

Against this background, there may be a need to provide a position detector, which has a higher reliability.

In addition to this, there may be a need to provide a position detector, which has, besides an increased reliability also a higher operational safety (or operation reliability).

This need may be satisfied by a position detector according to the patent claim 1, by a count sensor according to the patent claim 8, and by an absolute position sensor according to the patent claim 9 or 10. Preferred embodiments are subjects of the dependent claims.

According to an exemplary embodiment of the invention, and according to an aspect of the invention, a position detector comprises (i) a Wiegand module, which is composed of a Wiegand wire with a coil that surrounds the Wiegand wire, (ii) a measurement substrate, which defines a measurement plane and on which a first Hall element and a second Hall element are arranged, wherein the Hall elements are arranged on the measurement substrate such that their areas that are sensitive to a magnetic field extend in the measurement plane and/or form a part of the measurement plane, (iii) a processing electronic system, which comprises the first and the second Hall element and which is configured to evaluate an output signal that is output from the first Hall element and an output signal that is output from the second Hall element, and (iv) a permanent magnet assembly, which is movable relative to the Wiegand module and to the first and the second Hall elements in one direction as well as in a direction that is opposite to said one direction, wherein upon a movement of the permanent magnet assembly in said one direction, the coil of the Wiegand module generates a voltage pulse, if a north pole or a south pole of the permanent magnet assembly is located at a first position, and, upon a movement of the permanent magnet assembly in said opposite direction, the coil of the Wiegand module generates a voltage pulse, if the north pole or the south pole of the permanent magnet assembly is located at a second position that is different from the first position.

The alignment of the measurement substrate and of the areas of the Hall elements that are sensitive to a magnetic field may be considered mathematically. Two vectors having the same origin span the measurement plane. A plane, which is spanned by circumferential edges, which [edges] point respectively in two different directions, of the areas of the Hall elements, which [areas] are sensitive to a magnetic field, is identical with the measurement plane. That is, all the areas of the Hall elements, which are sensitive to a magnetic field, may extend in the measurement plane and/or form a part of the measurement plane. Likewise, a substrate surface, on which the Hall elements are arranged, may run at least parallel to the measurement plane.

The position detector according to the invention may concern either one, which can detect a rotating movement or one which can detect a linear movement of the permanent magnet assembly.

In the case that linear movements are to be determined by the position detector, the permanent magnet assembly may comprise at least two magnets or four magnetic poles— generally stated 2n magnets (wherein n=1, 2, 3, . . . , m)—, whereas in the case that rotating movements are to be determined by the position detector, the permanent magnet assembly may get along with only one single magnet. However, also in the case that rotating movements are to be determined by the position detector, the permanent magnet assembly may comprise a plurality of magnets—stated generally against 2n magnets (wherein n=1, 2, 3, . . . , m).

The first Hall element and the second Hall element, with their areas that are sensitive to a magnetic field forming a part of the measurement plane or with their areas that are sensitive to a magnetic field extending in the measurement plane, may in particular be arranged on the measurement substrate such that the measurement plane extends parallel to a plane of the movement, in which the permanent magnet assembly moves in said one or said opposite direction.

By the relative movement of the permanent magnet assembly with respect to the Wiegand module, there results a change of the magnetic field, as experienced by the Wiegand module, of the permanent magnet assembly. The Wiegand wire, which may preferably be manufactured from Vicalloy, may be formed in particular from a magnetically soft core with a magnetically hard shell (or lining). This embodiment may result in a physical characteristics of the Wiegand module and/or the Wiegand wire to the effect, that an abrupt change of the alignment of the Weiss domains of the Wiegand wires may result as from a specific amplitude of the magnetic field. This change in turn may result in the generation of the voltage pulse in the coil of the Wiegand module.

As a function of in which direction the permanent magnet assembly moves, i.e. in said one direction or in the direction that is opposite to said one direction, the north pole or the south pole of the permanent magnet assembly may be located at the said first or second position.

The Hall elements and the processing electronic system may preferably be integrated in a common integrated circuitry, which may be based either on a unitary integration technology, for example CMOS technology, or on different integration technologies, for example the CMOS and the FRAM technology.

In an autonomous mode, in which the position detector is not supplied with external energy (or auxiliary energy, or bought-in energy), the first and the second Hall elements and the processing electronic system may be supplied with energy, which may be provided by the Wiegand module.

The first Hall element and the second Hall element may be arranged such that the processing electronic system, by the evaluation of the output signal of the first Hall element and the output signal of the second Hall element, may obtain redundant information about whether the permanent magnet assembly moves in said one direction or in said opposite direction.

As mentioned, in the autonomous mode, the Hall elements and the processing electronic system may be supplied with the energy, which may accordingly be provided by the Wiegand module, and the output signals of the Hall elements may be evaluated by the processing electronic system. Irrespective of at which distance and how the Hall elements are arranged relative to each other, the evaluation of the output signals of both Hall elements may increase the reliability.

This may hold even for the special case, in which the first Hall element and the second Hall element may be arranged such that, after the determination of the voltage pulse, they may output simultaneously signals, the amounts of which may be identical. If, for example, the Hall elements are arranged such that (i) upon a movement of the permanent magnet assembly in said one direction, the first Hall element detects the one pole of the permanent magnet assembly at the same point in time when the second Hall element detects the respective other pole of the permanent magnet assembly, and (ii) upon a movement of the permanent magnet assembly in said opposite direction, none of the two Hall elements detects a pole of the permanent magnet assembly, and, after the determination of the voltage pulse, an inference (or conclusion) can be drawn as to the position and thus the movement direction of the permanent magnet assembly. This may be because the occurrence of an event of a simultaneous breakdown of both Hall elements in contrast to the use of only one Hall element may be much lower.

The processing electronic system may evaluate the output signals of the Hall elements for the obtainment of the redundant information preferably by comparing the output signals or the output voltages of the Hall elements with accordingly specified voltage thresholds.

Preferably, the first Hall element and the second Hall element may be arranged such that the processing electronic system, by the evaluation of the voltage pulse, the output signal of the first Hall element and the output signal of the second Hall element, may obtain redundant information about whether the north pole or the south pole is located at the first or the second position, and whether the permanent magnet assembly moves in said one direction or in the said opposite direction.

The said redundant information may particularly be obtained by the processing electronic system, if the first Hall element and the second Hall element are arranged such that they output output signals that are differently high (by absolute value, in the signal strength) as a function of whether the north pole or the south pole is located at the first or the second position after the determination of the voltage pulse.

Particularly preferably, the first Hall element may be arranged according to the first position and the second Hall element may be arranged according to the second position, such that they are arranged offset to each other by 25% of the total length of a repeating movement of the permanent magnet assembly with respect to the movement direction of the magnetic field, as experienced by the Wiegand module, of the permanent magnet assembly.

Stated differently, upon a movement of the permanent magnet assembly in said one direction, the first Hall element may output an output signal, which may correspond to the north pole or the south pole, upon occurring and/or after the determining the voltage pulse, whereby the second Hall element may not output an output signal upon occurrence and/or after the determination of the voltage pulse. Upon a reversal of the movement direction of the permanent magnet assembly, i.e. when the permanent magnet assembly moves in the opposite direction, the second Hall element may output an output signal, which may correspond to the north pole or the south pole, upon occurrence and/or after the determination of the voltage pulse, whereby the first Hall element may not output an output signal upon occurrence and/or after the determination of the voltage pulse.

Stated still differently, in a position detector for determining a rotational movement, the Hall elements may be located mirror-symmetrically with respect to a symmetry axis that may be formed by the Wiegand wire and may run in the measurement plane, or mirror-symmetrically with respect to a symmetry axis that may run in the measurement plane and may extend perpendicular to the Wiegand wire.

In a position detector for determining a linear movement/offset, this arrangement of the Hall elements may correspond to a mirror-symmetrical arrangement with respect to a symmetry axis that may correspond to the Wiegand wire and may run in the measurement plane.

The redundant information relating to the movement direction of the permanent magnet assembly may be obtained by the processing electronic system by evaluating the different output signals of the Hall elements, whereas the redundant information relating to the polarity of the permanent magnet assembly, i.e. whether the north pole or the south pole is located at the first or second position, may be obtained by the processing electronic system by the output signal of the Hall element that is associated with the respective position and by the polarity of the voltage pulse that is output by the Wiegand module.

Preferably, the processing electronic system may be configured to obtain the redundant information by putting in relation the output signal of the first Hall element with the output signal of the second Hall element on the one hand, and putting in relation a polarity of the voltage pulse generated by the coil with at least one of the output signals of the Hall elements on the other hand.

More preferably, the processing electronic system may be configured to obtain the redundant information by putting in relation the polarity of the voltage pulses generated by the coil respectively with the output signal of the first and the second Hall element.

Further preferably, the processing electronic system may be configured to output an error signal, if one of the redundant information cannot be obtained.

For example, the processing electronic system may put (i) the output signals of the Hall elements in relation to each other, (ii) the output signal of the first Hall element in relation to the polarity of the voltage pulse, and (iii) the output signal of the second Hall element in relation to the polarity of the voltage pulse. Hereby, the processing electronic system may recognize an error-free operation in that the evaluations (i)-(iii) indicate consistent redundant information about the polarity and the movement direction of the permanent magnet assembly. If only one of the evaluations (i)-(iii) and/or one of the obtained information is contradictory to the other ones, the processing electronic system may output the error signal.

In a preferred embodiment, the position detector may be configured to be switched over and/or to pass over to a non-autonomous operation by supplying the position detector with external energy and by charging an energy storage for the storage of electric energy, of the position detector with the external energy. In particular, the energy storage may be connected to the processing electronic system such that after the passing over of the position detector to the autonomous mode, it may supply the processing electronic system with the stored energy within a minimum time period after the passing over, if the Wiegand module does not supply sufficient energy at a point in time within the minimum time period.

In the non-autonomous mode, an external energy supply may be connected to the position detector, which may supply the position detector with the external energy. The supplied external energy may be stored intermediately in the energy storage, which may be for example a capacitor, and may be used during the operation of the position detector to supply the first Hall element and the second Hall element as well as the processing electronic system.

If the position detector passes over, or is switched over, from the non-autonomous mode to the autonomous mode and if the Wiegand module does not provide sufficient energy due to a reduced voltage pulse—which may be the case due to certain motion sequences of the permanent magnet—the first and the second Hall element as well as the processing electronic system may be supplied with (remaining) energy that may be stored in the energy storage, for the determination of the polarity and the movement direction of the permanent magnet assembly. Preferably, the energy storage may not only be charged with external energy in the non-autonomous mode, but may also be charged, in the autonomous mode, with energy that is provided by the Wiegand module. The energy storage may be composed preferably of one or a plurality of capacitors of the same or of a different size/capacity. Particularly preferably, the energy storage may be composed of a capacitor of a small size, which may be charged by the Wiegand module in the autonomous mode and which may supply the processing electronic system, and of a larger capacitor, which may be charged only in the non-autonomous mode and which may transfer its stored energy to the smaller capacitor in the autonomous mode, if the Wiegand module does not supply sufficient energy at a point in time within the minimum time period.

Preferably, the position detector according to the invention may further comprise a third Hall element, which may be arranged on the measurement substrate and which may be connected anti-serially to the first Hall element such that their output signals, which may indicate a magnetic field strength, may be added to a sum signal, wherein the first and the third Hall element may be arranged such that, if the north pole is located at the first position in the autonomous mode upon occurrence or after the determination of the voltage pulse, the output signal of the first Hall element may correspond to the north pole and the output signal of the third Hall element may correspond to the south pole; and a fourth Hall element, which may be arranged on the measurement substrate and which may be connected anti-serially with the second Hall element such that their output signals, which may indicate a magnetic field strength, may be added to a sum signal, wherein the second and the fourth Hall element may be arranged such that, if the north pole is located at the second position in the autonomous mode upon occurrence or after the determination of the voltage pulse, the output signal of the second Hall element may correspond to the north pole and the output signal of the fourth Hall element may correspond to the south pole.

The four Hall elements may particularly be arranged such that they span a virtual square or rectangle, at the corners of which the Hall elements are arranged.

If the position detector according to the invention is configured to determine a rotational movement of the permanent magnet assembly, the first and the third Hall elements and/or the second and the fourth Hall elements may be located at respective diagonally opposing corners of the virtual square/rectangle. In the other case, where the position detector according to the invention is configured to determine a linear movement/offset, the first and the third Hall elements and/or the second and the fourth Hall elements may be located at neighbouring corners of the virtual square/rectangle.

By the anti-serial connection of the Hall elements, the corresponding output signals of the Hall elements may be evaluated pair-wisely according to the difference principle, whereby the influence of noise fields (or interfering fields) may be eliminated and thus a higher operational safety may be achieved.

According to another exemplary embodiment of the invention, and according to a further aspect of the invention, a count sensor for counting the number of turns (or revolutions) or linear displacements of an object is provided. The count sensor comprises a position detector according to the preceding description, wherein the permanent magnet assembly is configured to be arranged at the object such that the permanent magnet assembly performs the turns or linear displacements together with the object.

Furthermore, the count sensor according to the invention may comprise a data memory, for example a FRAM or an EEPROM, for storing a value, which may indicate the number of turns or of the linear displacements.

The processing electronic system may be configured to count the number of the turns or of the linear displacements of the object on the basis of the redundant information and to store the corresponding value in the data memory.

As has been explained in the preceding, the position detector may be capable to determine the position—and thus the movement direction—of the permanent magnet assembly as well as the polarity of the permanent magnet assembly in particular by evaluating at least the output signals of the Hall elements. In the case, where the permanent magnet assembly comprises n=1 magnets, the resolution of the count sensor may be at about 0.5 turns.

The energy memory that has already been explained, in particular the larger capacitor, may be configured such that, in the autonomous mode, it may transfer its stored energy to the smaller capacitor, if the Wiegand wire does not provide sufficient energy at a point in time [during the minimum time period], and thereby may ensure a storing of the value within the minimum time period.

The determined value, which may indicate the number of turns or of the linear displacements, may be the value, which may indicate the (directional-independent) amount of the number, or the (directional-dependent) absolute value of the number.

According to still another exemplary embodiment of the invention, and according to a still further aspect of the invention, an absolute position sensor is provided, which comprises:

a count sensor, which has been explained in the preceding, wherein the count sensor comprises the position detector comprising four Hall elements; and a micro-controller; wherein in the non-autonomous mode, the processing electronic system is configured to output the output signals of the first to fourth Hall elements to the micro-controller, which is configured to determine, on the basis of the output signals of the four Hall elements, a precise degree of revolution (or rotation), in respect to a reference posture (or reference position), in particular an angular position, or, on the basis of the output signals of the Hall elements, a precise degree of a linear displacement with respect to a reference position, particularly a distance indicating the displacement, of the object.

According to still another exemplary embodiment of the invention, and according to a still further aspect of the invention, the absolute position sensor comprises the position detector having four Hall elements, which is preferably provided with four additional Hall elements. Accordingly, the position detector comprises eight Hall elements in total.

In the autonomous mode, the processing electronic system may be configured to output the output signals of the four additional Hall elements to the micro-controller, which may be configured to determine, on the basis of the output signals of the four additional Hall elements, a precise degree of the turn with respect to a reference posture (or reference position), in particular an angular position, or, on the basis of the output signals of the four additional Hall elements, a precise degree of the displacement with respect to a reference position, in particular a distance indicating the position, of the object.

BRIEF DESCRIPTION OF THE DRAWINGS

In the following, preferred embodiments of the invention are explained with reference to the appended figures.

DETAILED DESCRIPTION OF EXEMPLARY EMBODIMENTS

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

Figure 1:
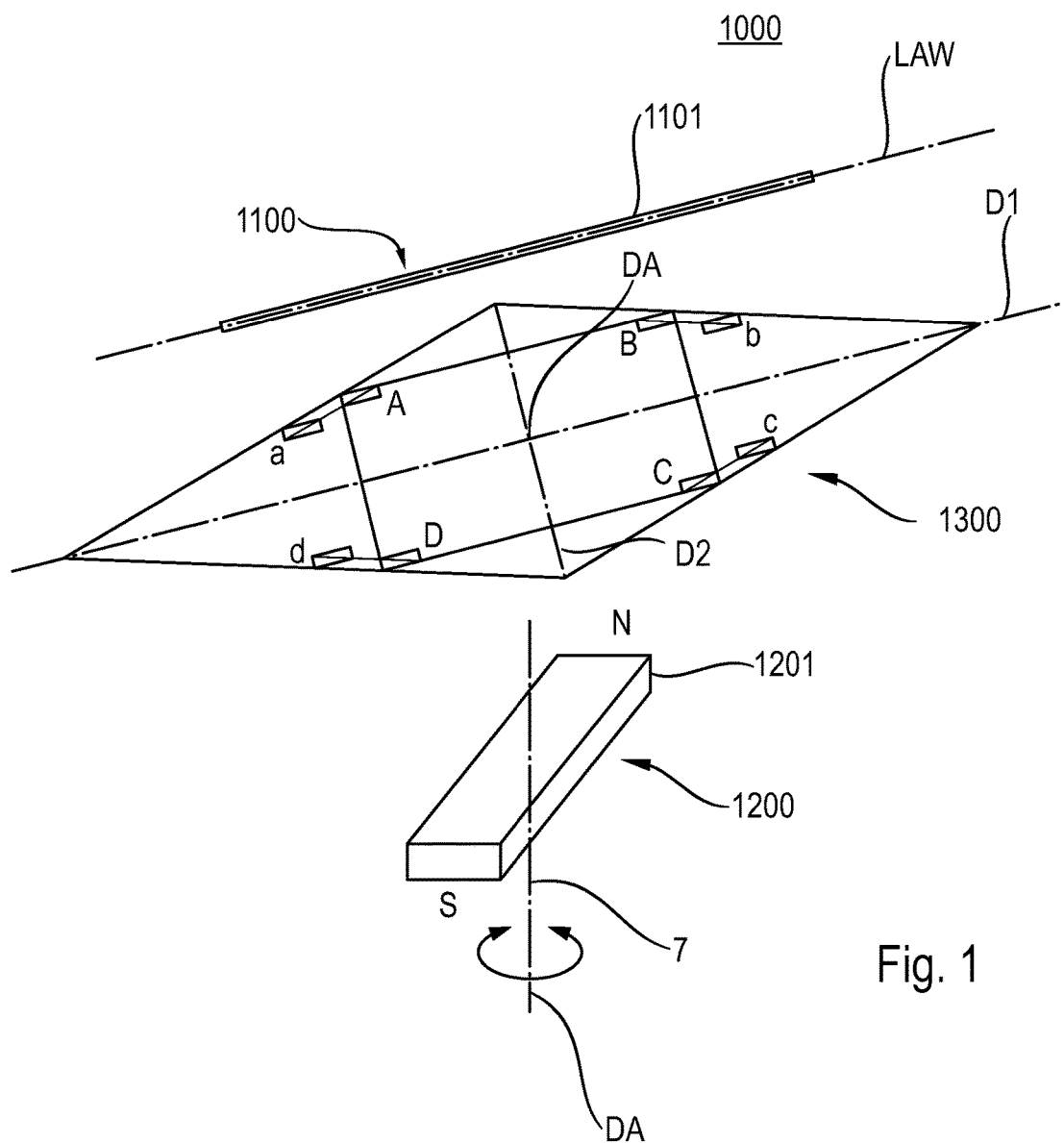
FIG. 1 illustrates a perspective view of an inventive absolute position sensor according to a first preferred embodiment of the invention, wherein the absolute position sensor comprises a position detector according to the invention and a count sensor according to the invention and is configured such that it is capable to detect an absolute position of a rotating permanent magnet.

FIG. 1 illustrates a perspective view of a first preferred embodiment of an absolute position sensor 1000 according to the invention, which comprises a count sensor according to the invention and a position detector.

The position sensor 1000 comprises a Wiegand module 1100, which comprises on the one hand a Wiegand wire 1101 and on the other hand a coil (not illustrated) wound around the Wiegand wire 1101, and a permanent magnet arrangement 1200, which may be composed of a cuboid-shaped permanent magnet 1201 in this first preferred embodiment. The permanent magnet 1201 may also be cylinder-shaped or may have any other regular shape.

The permanent magnet arrangement 1200 may be pivot-mounted such that a north pole N and a south pole S of the permanent magnet arrangement 1200 can rotate about a rotation axis DA. The rotation direction may be effected either in one direction, for example the clockwise direction, or in a direction that is opposite to the one direction, the counter-clockwise direction.

During an intended use, the permanent magnet arrangement 1200 may be mounted to an object that is rotating and may be to be monitored such that the rotation axis DA of the permanent magnet arrangement 1200 may correspond to the rotation axis of the object and thus the permanent magnet arrangement 1200 may rotate together with the object to be monitored.

The Wiegand wire 1101 may be composed of a magnetically soft core and a magnetically hard shell (or lining). Upon a rotation of the permanent magnet arrangement 1200, the domains and/or Weiss domains of the Wiegand wire 1101 may change their orientation abruptly as from a specific change or rotation of the magnetic field, whereby as a result from this, a voltage pulse may result, which may be output by the coil that may be wound around the Wiegand wire 1101 and/or may surround the Wiegand wire. Due to the formation of the Wiegand wire 1101 of magnetically soft and magnetically hard regions (core and shell), the abrupt change of the orientation of the domains may occur as a function of the rotation direction of the permanent magnet arrangement 1200 in different postures of the permanent magnet arrangement 1200.

If the permanent magnet arrangement 1200 rotates starting from a position, in which the longitudinal axis of the cuboid-shaped permanent magnet is aligned parallel to a longitudinal axis LAW of the Wiegand module 1100, for example in the clockwise direction, the abrupt change of the orientation of the domains may result after a rotation of the cuboid-shaped permanent magnet 1201 by about 135°. In this posture (or position) of the permanent magnet 1201, either the corresponding north pole N or the south pole S may be is located at a first position.

By contrast, if the permanent magnet arrangement 1200 rotates starting from the explained starting position in the counter-clockwise direction, the abrupt change of the orientation of the domains may result again after the rotation of the cuboid-shaped permanent magnet 1201 by about 135°, wherein in this posture (or position) of the permanent magnet 1201, the north pole N or the south pole S may be located at a second position, which is different from the first position.

The inventive absolute position sensor 1000 according to the first preferred embodiment of the invention may comprise, besides the Wiegand module 1100 and the permanent magnet arrangement 1200 also a measurement substrate 1300, which may preferably have a square (or quadratic) shape. As can be seen from FIG. 1, the measurement substrate 1300 may be located between the Wiegand module 1100 and the permanent magnet arrangement 1200, wherein the measurement substrate 1300 may define a measurement plane, which may extend parallel to the plane of the movement, in which the cuboid-shaped permanent magnet 1201 may rotate.

Figure 2A:
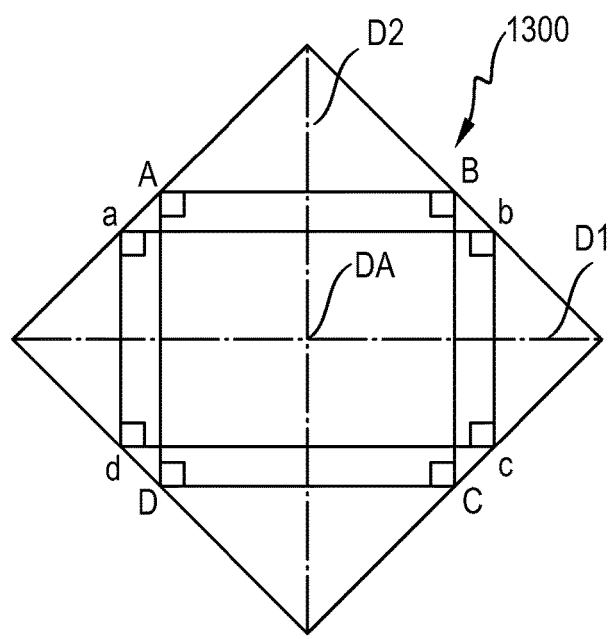
FIGS. 2A to 2C illustrate preferred variants of a measurement substrate, which can be employed for the absolute position sensor according to the first preferred embodiment.

A plurality of Hall elements A to D and a to d may be arranged on the measurement substrate 1300. The plurality of Hall elements is visible well both in the perspective view according to FIG. 1 and also in the plan view of the measurement substrate 1300 illustrated in the FIG. 2A. FIG. 2A corresponds to a view of the measurement substrate 1300 perpendicular to the rotation axis DA, which may pierce into the measurement substrate 1300 at the center point thereof.

The illustrated four Hall elements a to d may form a part of the position detector according to the invention, wherein their output signals may be evaluated in an autonomous mode, that is still to be explained, for determining the position and rotation direction of the permanent magnet arrangement 1200.

The four additional Hall elements A to D may serve for a fine resolution of the posture (or position) of the permanent magnet arrangement 1200 in a non-autonomous mode that is still to be explained.

All the Hall elements may be arranged on the measurement substrate 1300 such that their active areas that are sensitive to a magnetic field may extend in the measurement plane.

Each of the additional Hall elements A to D may be located respectively both at an outer edge of the measurement substrate 1300 and at a center of an edge of the corresponding outer edge of the measurement substrate 1300.

In addition, the Hall elements A to D, which may be formed four-sidedly, may be arranged at the center of the edge in a rotated manner such that a diagonal, which connects two corners of the respective Hall element may be perpendicular to the respective outer edge. This arrangement of the Hall elements A to D may be chosen in particular because the mechanical tensions at these positions are lower, particularly much lower, than at the corresponding corners of the quadrangular measurement substrate 1300.

Each of the additional Hall elements A to D may have four contacts, wherein two of the contacts may form the current contacts and the other two contacts may form the contacts of the Hall voltage of the respective Hall element.

Alternatively, the Hall elements A to D may also be octagonal Hall elements each having eight contacts, wherein also in this case, a diagonal, which connects two opposing corners of the respective octagonal Hall element, may be perpendicular to the corresponding outer edge. In this case, two respective opposing contacts may form the current contacts and the respective two contacts, which are respectively orthogonal to the current contacts, may form the Hall voltage contacts.

The four additional Hall elements A to D may be operated particularly in the non-autonomous mode of the position sensor 1000, in which the position sensor 1000 may be supplied with external energy, and their output signals may be output to a micro-controller 3100, which is explained in the following and which may be capable to calculate from these for example the precise angular posture (or position) of the permanent magnet arrangement 1200 and/or of the object in relation to a reference posture (or reference position). Insofar, the four additional Hall elements A to D may be used for a fine resolution.

In the mentioned non-autonomous mode, also the value, which may reflect the number of turns of the permanent magnet arrangement 1200, can be determined from the output signals.

The respective output signals of the additional Hall elements A to D may be evaluated pair-wisely according to the difference principle in order to eliminate noise fields (or interference fields) and noise quantities (or interfering quantities) in the output signals. In this respect, the output signals of the Hall elements A and C may be evaluated such that the portions of the output signals, which may be based on the magnetic field components which may be aligned oppositely and may permeate the Hall elements A and C, add [to each other], whereas the portions of the output signals, which may be based on magnetic field components that may be aligned unidirectionally and may permeate the Hall elements A and C, may subtract and may thus cancel each other. The output signals of the other two Hall elements B and D may be evaluated likewise.

Besides the already explained additional Hall elements A to D, also the mentioned four Hall elements a to d may be arranged on the measurement substrate 1300, which may be arranged respectively slightly offset with respect to the Hall elements A to D. Because the output signals of these Hall elements a to d may only be compared with a voltage threshold, they may be implemented such that they need significantly less (electrical) charge than the additional Hall elements A to D. The four Hall elements a to d may span a virtual rectangle, which may be located with respect to the virtual square that may be spanned from the additional Hall elements A to D such that the diagonals of the measurement substrate 1300 intersect the respective sides of the virtual square and of the virtual rectangle in their center points.

The Hall elements a to d may be required in particular in an autonomous mode, in which the position sensor 1000 may not be supplied with external energy, in order to determine the value, which may reflect the number of turns and/or revolutions of the permanent magnet arrangement 1200. However, the output signals of the Hall elements a to d may also be used in the non-autonomous mode for determining the number of turns and/or revolutions of the permanent magnet arrangement.

The output signals of the Hall elements a to d may be evaluated preferably pair-wisely according to the difference principle, like for the other additional Hall elements A to D.

In FIG. 2A, the horizontal diagonal D1 of the measurement substrate 1300 may correspond to the alignment of the longitudinal axis LAW of the Wiegand module 1100. If the permanent magnet 1201 of the permanent magnet arrangement 1200 rotates about the rotation axis DA in the clockwise direction, the abrupt change of the domains of the Wiegand wire 1101 may result, as has been explained already in the preceding, if the north pole N or the south pole S are located at the explained first position.

As can be seen from the FIGS. 1 and 2, this first position may correspond in the measurement plane approximately the position of the Hall element B. Stated differently, the first position and that of the Hall element B may be located one behind the other or one over the other in the direction of the rotation axis DA.

The Wiegand wire 1101, which may be made of magnetically soft and magnetically hard domains, can also be formed such that the mentioned first position, at which the north pole N or the south pole S of the permanent magnet arrangement 1200 are located at the triggering of the voltage pulse, may correspond to the position of the Hall element b with respect to the measurement plane. Stated differently, the north pole N or the south pole S of the permanent magnet 1201 may be located over the Hall element b in the first position.

When the permanent magnet arrangement 1200 is located in the posture, in which one of the poles is located at the first position, the respective other magnetic pole may be in the same spatial relationship to the Hall element d. In this posture, the magnetic field, which may be generated by the permanent magnet arrangement 1200, may permeate the active areas of the Hall elements b and d, which may be sensitive to a magnetic field, respectively in the opposite orientation, such that the output signals, which may be evaluated according to the difference principle, may add [to each other]. The other pair of Hall elements a and c may hardly experience the magnetic field of the permanent magnet arrangement 1200 due to their spatial offset (or displacement) in this posture, which may be why their output signals approach zero (already because of the difference principle), when the north pole N or the south pole S of the permanent magnet arrangement 1200 is located at the first position and the coil of the Wiegand module 1100 outputs the voltage pulse.

Upon a movement of the permanent magnet arrangement 1200 in the opposite direction, i.e. upon rotation of the cuboid-shaped magnets 1201 in the counter-clockwise direction, the abrupt change of the orientation of the domains of the Wiegand wire 1101 may result in an equivalent manner, when the north pole N or the south pole S of the permanent magnet arrangement 1200 is located in a second position that is different from the first position.

The second position may correspond either to the Hall element c or C, depending on the implementation of the Wiegand wire 1101. When the north pole N or the south pole S is located in the second position, the respective other magnetic pole may be located in the same spatial relationship to the Hall element A or a. The output signals of the Hall elements a and c may be evaluated in the same manner as those of the Hall elements b and d.

As a function of in which direction the permanent magnet arrangement 1200 rotates, in the normal case, the inference can be drawn from the output signals of the pairs of the Hall elements a, c and b, d, whether the permanent magnet arrangement 1200 rotates in the one direction—the clockwise direction—or in the direction that is opposite to said one direction—the counter-clockwise direction.

Furthermore, also the positions of the magnetic poles can be detected from the polarity of the output signals of the Hall elements a, c and b, d, i.e. it can be determined, whether the north pole N or the south pole S is located at the first or the second position. Insofar, in the autonomous mode, the resolution of the position detector according to the invention may amount to one half turn.

Theoretically, the number of the Hall elements a to d can be reduced. For example, one of the pairs of Hall elements a, c and b, d could be omitted. The inference (or conclusion) as to the rotation direction of the permanent magnet arrangement 1200 can be drawn from the output signals of the remaining pair of Hall elements upon occurrence and/or after the determination of the voltage pulse of the Wiegand module 1100. Namely, if the pair of Hall elements does not provide output signals upon the occurrence and/or after the determination of the voltage pulse, one may proceed from the assumption that the permanent magnet arrangement 1200 rotates in the direction, for which no pair of Hall elements is conceived. The information on how the polarities of the permanent magnet 1201 are oriented in this state, can be determined from the polarity of the voltage pulse of the Wiegand module.

By contrast, if the pair of Hall elements provides output signals, one may proceed from the assumption that the permanent magnet arrangement 1200 rotates in the corresponding direction.

Figure 2B:
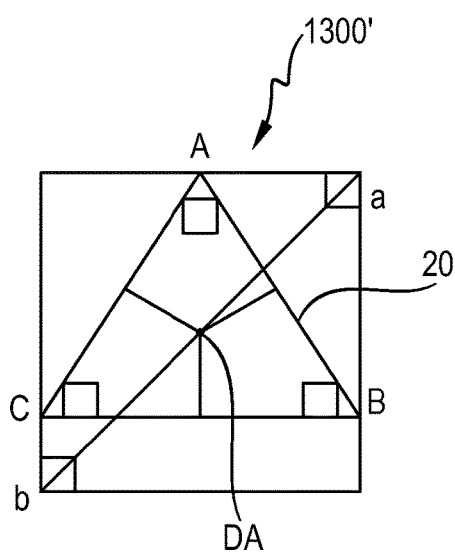

FIG. 2B shows an alternative embodiment of a measurement substrate 1300', which may come to application in the absolute position sensor 1000 according to the invention.

The measurement substrate 1300' may differ from that of the FIG. 2A in that only three additional Hall elements A to C may be conceived for the precise determination of the angular posture of the permanent magnet arrangement 1200, i.e. for the fine resolution, and only two Hall elements a, b may be conceived for the determination of the value, which may indicate the number of turns of the permanent magnet arrangement 1200.

The additional Hall elements A to C may span a virtual equilateral triangle, wherein the Hall element A may be located at the upper edge of the measurement substrate 1300' as shown in FIG. 2B and at the respective center of the edge.

The center of area of the equilateral triangle may be identical to the center of the square-shaped measurement substrate 1300'.

The Hall elements a, b may be located in the corners of the measurement substrate 1300' on the respective diagonal. The output signals of the Hall elements a, b may be evaluated according to the difference method that has been explained already.

FIG. 2C shows again an alternative embodiment of a measurement substrate 1300", wherein only four Hall elements may be are arranged on this measurement substrate 1300", which [Hall elements] may be part of the absolute position sensor according to the invention as well as of the position detector according to the invention or of the count sensor according to the invention.

In the autonomous mode, for the determination of the position of the magnetic poles and/or the rotation direction of the permanent magnet arrangement 1200 and/or the number of turns, the output signals of the pair of the Hall elements a, c may be evaluated according to the difference principle and the output signals of the pair of the Hall elements b, d may also be evaluated according to the difference principle.

In the other mode, the non-autonomous mode, the output signals of the Hall elements a to d may be used according to the difference principle for the fine resolution. Insofar, in the non-autonomous mode, the Hall elements a to d, may take over also the function of the additional Hall elements A to D that have been explained in the preceding.

Figure 3:
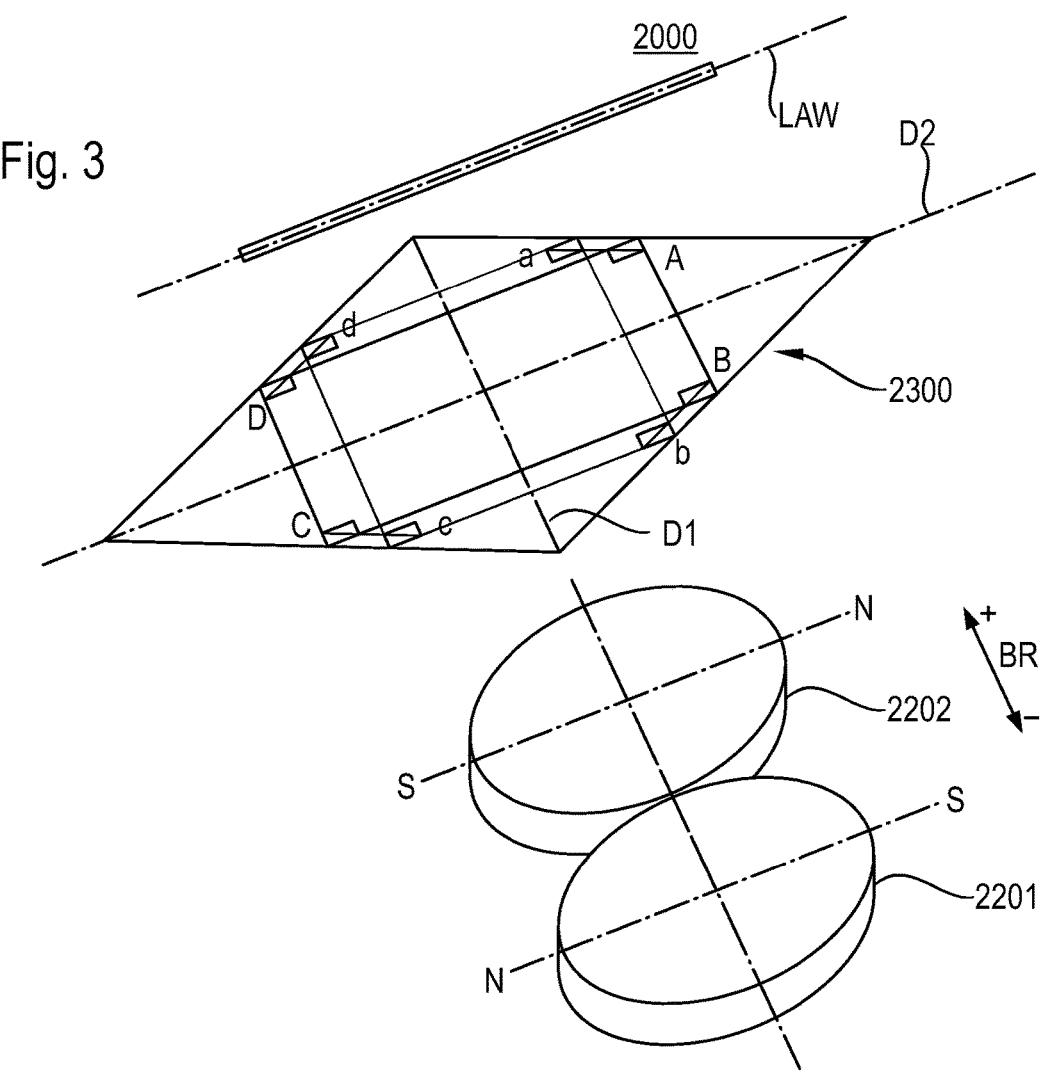
FIG. 3 illustrates an absolute position sensor according to a second preferred embodiment of the invention, wherein the absolute position sensor is configured to determine a linear displacement of a permanent magnet assembly, which is composed of two permanent magnets.

FIG. 3 illustrates a second preferred embodiment of an absolute position sensor 2000 according to the invention, which may also include a count sensor according to the invention and a position detector according to the invention.

The difference to the position sensor 1000 of the first preferred embodiment consists in that the position sensor 2000 according to the second preferred embodiment cannot detect rotations, but linear displacements.

The position sensor 2000 comprises a Wiegand module 1100, which may be identical to that of the first preferred embodiment, which is why reference is made to the respective explanations.

Furthermore, the position sensor 2000 may also comprise a permanent magnet arrangement 2200, which may be composed of two cylinder-shaped permanent magnets 2201, 2202 in this embodiment. However, the permanent magnets may also have other shapes.

According to intended use, the permanent magnet arrangement 2200 may be displaced linearly along the shown movement direction BR. Herein, the movement can be effected in said one direction, positive movement direction BR, or in the direction that is opposite thereto, negative movement direction BR. The permanent magnets 2201, 2202 may be polarized opposite to each other and may be aligned such that their north pole-south pole-axes are aligned perpendicular to the movement direction BR.

The position sensor 2000 may also comprise a measurement substrate 2300, on which a plurality of Hall elements and a processing electronic system may be arranged, too.

The measurement plane, in which the measurement substrate 2300 runs, and the plane of movement, in which the permanent magnet arrangement 2200 moves, may extend preferably parallel to each other, too.

The measurement substrate 2300 may be identical with that of the first embodiment, except for the difference that not the output signals of the Hall elements, which may be located on the diagonals of the virtual square and/or rectangle may be evaluated jointly, but those [output signals] of the Hall elements, which may be located on one side of the measurement substrate 2300 with respect to the diagonal D2. Regarding FIGS. 2A, 2C and 3, this may mean that the output signals of the Hall elements B, C may be evaluated jointly and/or simultaneously for the determination of the posture of the permanent magnet arrangement 2200 (fine resolution) and the output signals of the Hall elements b, c [are evaluated jointly] for the determination of the value, which may indicate the number of repeating linear displacements.

The same may hold for the evaluation of the output signals of the Hall elements A, D and a, d.

The diagonal D1 of the measurement substrate 2300, which may run perpendicular to the diagonal D2, when seen from the direction perpendicular to the measurement substrate 2300, may be congruent with the symmetry axis of the permanent magnets 2201, 2202, which may run in the movement direction BR. Stated otherwise, the plane, in which the symmetry axis of the permanent magnets 2201, 2202, which may point in the movement direction BR, and the diagonal D1 may run, may be perpendicular to the measurement plane.

If the permanent magnet arrangement 2200 in FIG. 3 moves in the one direction or in the direction that is opposite thereto (positive or negative BR direction), this may lead to a change/pole reversal of the magnetic field as experienced by the Wiegand module 1100. This change of the magnetic field may lead to the already explained, abrupt change of the orientation of the domains of the Wiegand wire 1101 as from a specific amplitude, and thus to the generation of the voltage pulse by the coil of the Wiegand module 1100. Due to the formation of the Wiegand wire 1101 from magnetically soft and magnetically hard sections, the triggering of the voltage pulse may be effected in such different postures of the permanent magnet arrangement 2200 (first and second position), that in the normal case an inference as to the movement direction BR of the permanent magnet arrangement 2200 and the alignment of the determined permanent magnets 2201 or 2202 can be drawn from the output signals of the Hall elements b, c and a, d.

Figure 4:
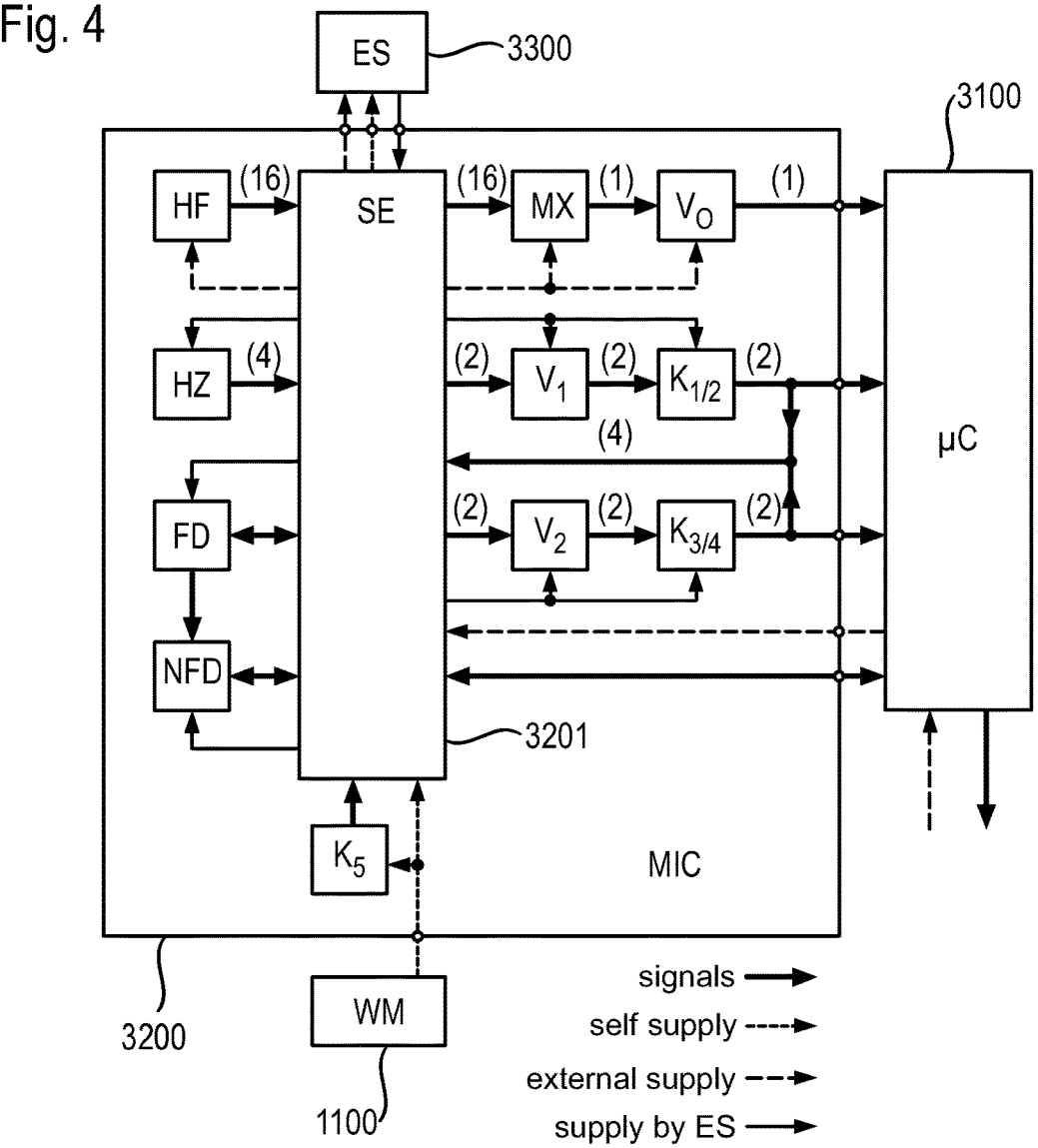
FIG. 4 illustrates a schematic arrangement of the total electronic system, which may come to application in the absolute position sensor according to the first preferred embodiment and according to the second preferred embodiment.

If the permanent magnet arrangement 2200 moves for example in the positive direction shown in FIG. 4, upon triggering of the voltage pulse, the Hall elements b, c may be located over the north pole and the south pole of the permanent magnet 2201 (first position), and may output an according signal, whereas the Hall elements a, d may be located approximately between the permanent magnets 2201, 2202 in this state and correspondingly may output no or very small output signals.

FIG. 4 illustrates schematically the composition of the total electronic system of the absolute position sensor according to the first or second preferred embodiment of the invention.

The total electronic system may comprise a processing electronic system 3200, which may be electrically connected to a micro-controller 3100, the Wiegand module 1100, and an energy storage 3300. All the elements, which are contained in the square referenced by MIC in FIG. 4, may be arranged on the respective measurement substrate and may form the processing electronic system. Preferably, the processing electronic system may be integrated on the measurement substrate. The Wiegand module 1100 may be arranged on a printed circuit board, on which for example also the measurement substrate, the energy storage 3300 and the micro-controller 3100 may be located.

The processing electronic system may be arranged completely on the measurement substrate 1300, 1300', 2300, wherein all the elements may preferably be based on an identical integration technology. Preferably, the measurement substrate may concern a silicon substrate, on which all the elements may be realized for example in the CMOS-integration technology.

In the following, the total electronic is described starting from the assumption that the position sensor comprises a measurement substrate having four additional Hall elements A to D for the fine resolution and four Hall elements a to d for the determination of the value, which may indicate the number of turns or of linear displacements.

In FIG. 4, the shortly dashed lines/arrows may symbolize the course of the self energy supply, the longly dashed lines/arrows that of the external energy supply, the thin continuous lines/arrows the course of the supply by the energy storage (ES) 3300 and the thick continuous lines/arrows the course of the signals.

The position sensor according to the first and the second preferred embodiment may be operated either in a non-autonomous mode, in which the position sensor may be supplied with external energy (or auxiliary energy or bought-in energy), or in an autonomous mode, in which the position sensor may be supplied with energy that is stored in the energy storage 3300.

The processing electronic system 3200 located on the measurement substrate 1300, 1300', 2300 may contain a control electronic SE, which may be connected to the Hall elements (A to D) HF for the fine resolution and via a multiplexer MX to a first amplifier V0.

(Non-Autonomous Mode)

In the non-autonomous mode, the external energy supply may be effected via the micro-controller 3100, which may be is electrically connected to the control electronic SE for this purpose. The control electronic SE in turn may supply the Hall elements HF, the multiplexer MX and the first amplifier V0 with the received external energy, and, furthermore may charge the energy storage ES 3300 which may preferably be composed of one or plural capacitors, with the external energy. Very particularly preferred, the energy storage ES 3300 may be composed of at least two capacitors having different capacities, wherein a small capacitor with a smaller capacity and a large capacitor with a larger capacity may be conceived, which may both be charged with the received external energy in the non-autonomous mode.

In the non-autonomous mode, the control electronic SE may receive 16 signals from the additional Hall elements A to D, which may each be provided with two current contacts and two Hall voltage contacts in this variant of the electronic system shown in FIG. 4. The 16 signals may result from the fact that the Hall elements A to D are operated in a "spinning current" method, in which both the current contacts and the Hall voltage contacts may be exchanged once for each Hall element, and also their polarity may be changed once, respectively. Insofar, four output signals may result from each Hall element, which output signals may be delivered to the control electronic SE.

The control electronic SE may output the 16 signals to the input of the multiplexer MX, which may connect through the received signals in a specified sequence, selectively, to its output, and may output them via a single line to the first amplifier V0. The specified sequence may be selected flexibly as a function of whether the position sensor is that of the first or that of the second preferred embodiment.

The first amplifier V0 may amplify the received signal and may output this after amplification to the micro-controller 3100. The signal may, in this state, still be an analog signal, wherein the micro-controller 3100 may convert this signal from analog to digital, and may receive 16 signals again via a demultiplexer for further processing.

On the basis of the received signals, the micro-controller 3100 may be capable to calculate the precise present posture (or position) of the permanent magnet arrangement with respect to a reference posture, i.e. in the case of the position sensor 1000 according to the first preferred embodiment the angular posture of the permanent magnet 1201 and in the case of the position sensor 2000 according to the second preferred embodiment the degree of the linear displacement of the permanent magnet arrangement 2200.

The four Hall elements a to d, which are referenced in FIG. 4 by HZ, may be supplied with energy from the energy storage ES. Since at least in the non-autonomous mode, the energy storage ES may be charged with external energy, the Hall elements HZ may be charged indirectly with the external energy, such that all Hall elements may output output signals, which may correspond to the magnetic poles, in sequence as a function of the movement direction of the permanent magnet arrangement.

The four Hall elements HZ may be connected with the control electronic SE and may output their four output signals, respectively, to the control electronic SE, which may process the respective two output signals of the pairs of the Hall elements according to the difference principle and thus may obtain in result one signal for each pair of Hall elements.

The two signals, which may be obtained in result for both pairs, may be output block-wisely via a second amplifier V1 to two comparators K1/K2 and block-wisely via a third amplifier V2 to two comparators K3/K4. Two of the comparators may perform a comparison with a negative threshold voltage, and the two other ones of the comparators may perform a comparison with a positive voltage threshold, such that each signal, which may have been obtained in result according to the difference principle, may be compared with a positive and with a negative voltage threshold.

The four obtained output signals of the comparators K1 to K4 may be on the one hand returned to the control electronic SE, and on the other hand may be output to the micro-controller 3100. The four obtained output signals of the comparators K1 to K4 may allow an interpretation to the effect, in which posture (or position) the permanent magnet arrangement 1200 may reside and/or how the magnetic poles may be oriented. The continuous evaluation of the output signals of the Hall elements, which may occur sequentially, may also allow an inference as to in which direction the permanent magnet arrangement 1200 (clockwise direction or counter-clockwise direction) or 2200 (linear displacement in the positive or negative movement direction) moves.

From this, the value of repeating motion sequences (turns or number of complete linear displacements) of the permanent magnet arrangement can be determined. This determination may be effected, on the one hand, in the micro-controller 3100, which may determine from this value and from the precise present posture of the permanent magnet arrangement (angular position or degree of linear displacement) the absolute position of the permanent magnet arrangement, and may output this to an application, and, on the other hand, in the control electronic SE, which may store this value in a volatile data memory FD and/or in a non-volatile data memory NFD.

The four Hall elements HZ, the amplifiers V1, V2, the four comparators K1 to K4 as well as the data memory (volatile data memory FD and non-volatile data memory NFD) may also be supplied with energy from the energy storage 3300.

The volatile data memory FD may be for example a register that may be based on the CMOS technology. The non-volatile data memory NFD may be for example an EEPROM that may also be based on the CMOS technology. The processing electronic system may be implemented such that it can operate at temperatures above 140° C., particularly at 160° C., without problems. Hereby, both data memories may be implemented particularly such that they can operate at temperatures above 140° C., particularly at 160° C., and can obtain their storage values without problems.

The function of the fine resolution, which has been explained in the preceding and which may be realized in the non-autonomous mode, may be a purely preferred embodiment and extension of the position detector and/or count sensor according to the invention.

The processing electronic system comprising the Hall elements HZ, the amplifiers V1, V2, the comparators K1 to K4 as well as the control electronic SE with its function to determine the orientation of the permanent magnet arrangement on the basis of the output signals of the Hall elements HZ, may belong to the elements of the position detector according to the invention.

The elements of the position detector according to the invention and the additional function of the control electronic SE, namely to determine the value, which indicates the number of the repeating motion sequences, and to store them in the volatile data memory and/or in the non-volatile data memory, may belong to the elements of the count sensor according to the invention.

If the output signals of the comparators K1 to K4 in the micro-controller 3100 are not needed, i.e. if the invention may concern exclusively the count sensor according to the invention, the output of the output signals of the comparators K1 to K4 to the micro-controller 3100 may not be necessary. In this case, the latter may have only access to the volatile data memory and/or to the non-volatile data memory and can output the value, which may have been accordingly read out, to the outside to an application.

(Autonomous Mode)

In some applications, the case may occur that the external energy supply breaks down or is temporarily not at disposition. In this situation, the precise present posture (or position) of the permanent magnet arrangement, i.e. the angular posture or the degree of linear displacement, may be of subordinate importance. However, in this situation, care must be taken, in order that the value, which may indicate the number of repeating motion sequences (turns or number of complete linear displacements), is continuously sampled and stored, so that the value may be available upon re-establishment of the external energy supply.

When the external energy supply breaks down or is not at disposition, the four Hall elements HF, the multiplexer MX and the amplifier V0 may not be operated. If the function of the fine resolution is not conceived and/or a pure count sensor or a position detector is concerned, particularly the four Hall elements HF, the multiplexer MX and the amplifier V0 may not be conceived anyway.

In the autonomous mode, the Wiegand module 1100, which may provide voltage pulses as a function of the speed of the permanent magnet arrangement in a corresponding frequency, may take over the energy supply.

In the autonomous mode, the control electronic SE may take over the control and management of the energy supply of the processing electronic system, for example by rectifying the voltage pulses provided from the Wiegand module 1100 and outputting these for charging the small capacitor of the energy storage ES 3300. The large capacitor may not be charged in the autonomous mode, but may only deliver its energy to the small capacitor, if needed, for example via a diode.

The energy storage ES, which may be composed from the small and the large capacitor, may be completely or very strongly charged initially after the discontinuation of the external energy supply.

In the autonomous mode, the small capacitor may supply the Hall elements HZ, the amplifiers V1/V2, the comparators K1 to K4, the data memories FD/NFD, and may be discharged by the corresponding energy consumption in the autonomous mode. As has been explained already, the Wiegand module 1100 may provide the voltage pulses, which may be used for charging the small capacitor.

The determination of the value, which may indicate the number of repeating motion sequences (turns, or complete linear displacements), may be effected similarly as in the non-autonomous mode by an evaluation of the output signals of the comparators K1 to K4. The difference may consist only in that the output signals of the Hall elements and thus of the comparators may be effected only, if a voltage pulse of the Wiegand module is determined. The determination, as to whether an evaluable voltage signal is present or not, may be effected via a comparator K5, which may be connected directly to the output of the coil of the Wiegand module 1100, as can be seen from FIG. 4, and which may signal to the control electronic SE, whether an evaluable voltage signal or a voltage pulse is present or not. In this connection, the comparator K5 may compare the voltage, which may be output from the coil of the Wiegand module 1100 with a voltage threshold, and may signal to the control electronic SE that an evaluable voltage signal and/or a voltage pulse is present, if the voltage, which is output from the coil of the Wiegand module 1100, exceeds the voltage threshold.

As has been explained in detail in the preceding, the voltage pulse of the Wiegand module 1100 may be triggered as a function of the direction, in which the permanent magnet arrangement may move, if the north pole or the south pole of the permanent magnet arrangement is located at the first or second position. Accordingly, both the alignment of the permanent magnet arrangement and movement direction thereof can be determined from the output signals of the comparators K1 to K4. Based on this, the value, which may indicate the number of repeating motion sequences, may be determined, stored in the volatile data memory and transferred to the non-volatile data memory, if needed.

During operation, the case may occur that the Wiegand module 1100 or the coil thereof outputs a "rudimentary" voltage pulse, which indeed may exceeds the voltage threshold of the comparator K5, however may not provide sufficient energy in order to be able to perform the storing process for the value, which may indicate the number of repeating motion sequences, in the volatile data memory and/or in the non-volatile data memory. In this case, the large capacitor may take over the bridging energy supply by transferring the missing energy to the small capacitor. For example, the Wiegand module 1100 and the small capacitor may be implemented such that the Wiegand module 1100 may charge the small capacitor with each voltage pulse to 8-9 V. On the other hand, the large capacitor can be implemented such that in the strongly charged state thereof, it may have and/or may output a voltage of for example 5 V. That is, the large capacitor may transfer energy to the small capacitor, if the voltage of the small capacitor falls below 4.4 to 4.6 V (diode is accounted for), and thus may ensure the execution of the storing process.

The large capacitor can preferably be implemented such that it is capable to take over this bridging of the energy supply starting from the discontinuation of the external energy supply for a minimum time period of 20 min, 30 min, 1 h, 5 h, 1 day or plural days including consideration of leak currents.

Understandably, in the autonomous mode, an output of the stored value to the micro-controller may not be effected.

At this point it is to be mentioned that the reliability (probability of survival) of the position detector according to the invention and that of the count sensor according to the invention may be strongly increased in particular in the autonomous mode.

The reason for this is that the determination of the movement direction of the permanent magnet arrangement may always be effected on the basis of the output signals of plural Hall elements.

In the present implementation of the electronic system, the two signals, which may be obtained according to the difference principle, may be delivered to the four comparators K1 to K4, and the corresponding obtained four output signals of the comparators may be evaluated jointly and/or put in relation to each other. Provided a correct operation of all elements, the signals, which may be are output from the comparators, may contain redundant information relating to the movement direction of the permanent magnet arrangement, because one of the pairs of Hall elements (for rotations of the permanent magnet arrangement: a, c or b, d; for linear displacement of the permanent magnet arrangement: a, d or b, c) may inevitably output output signals after the determination of the voltage pulse as a function of the movement direction of the permanent magnet arrangement, which [output signals] may lead to exceeding the used threshold voltages of the comparators K1 to K4, whereas the other pair may not be supposed to output output signals.

Furthermore, the reliability in the autonomous mode can preferably be increased in that redundant information not only relating to the movement direction of the permanent magnet arrangement may be obtained via the comparators K1 to K4, but also relating to the alignment of the poles of the permanent magnet arrangement. The evaluation of the signals obtained from the comparators K1 to K4 may provide inference as to whether the north pole or the south pole of the permanent magnet arrangement is located at the first or second position. Furthermore, the same information about this can be obtained redundantly also by evaluating the polarity of the voltage pulse, which may be output from the Wiegand module 1100 and may be respectively put in relation with the two signals that may be obtained for both pairs of Hall elements according to the difference principle, or with the corresponding output signals of the comparators K1 to K4.

The control electronic SE may preferably be implemented such that it may store, for example, an error message or may output an error message as a flare (or light signal) in the non-autonomous mode, if not all of the redundant information relating to the movement direction and/or the alignment of the polarities can be obtained.

Ultimately, the reliability may be increased also by the large capacitor of the energy storage ES 3300, because after a discontinuation of the external energy supply, the probability of erroneous storing processes can be reduced in the mentioned minimum time period.

Besides the increase of the reliability, which may be obtained due to the evaluation of redundant information, the operational safety may be increased further (or additionally) in the position detector and count sensor according to the invention, because the output signals of the Hall elements may be evaluated according to the difference principle and thus disturbing variables may be eliminated.

(Alternatives)

It has already been explained in the preceding that one of the pairs of Hall elements (in FIG. 1: either a, c or b, d; in FIG. 4: a, d or b, c) can be omitted on the measurement substrate. In this implementation of the measurement substrate, only two comparators may be present. Even in this case, the operational safety may remain maintained and the reliability increased, because in this case, the processing electronic system can recognize (or determine) a too low signal strength of the signal that has been obtained according to the difference principle, which [low signal strength] may point to the failure of one of the Hall elements.

If emphasis is put on reliability, and operational safety is of subordinate importance, i.e. the difference principle must not be performed, the measurement substrate may also be provided with only two Hall elements, which may be arranged offset to each other in the movement direction of the permanent magnet arrangement.

Figure 2C:
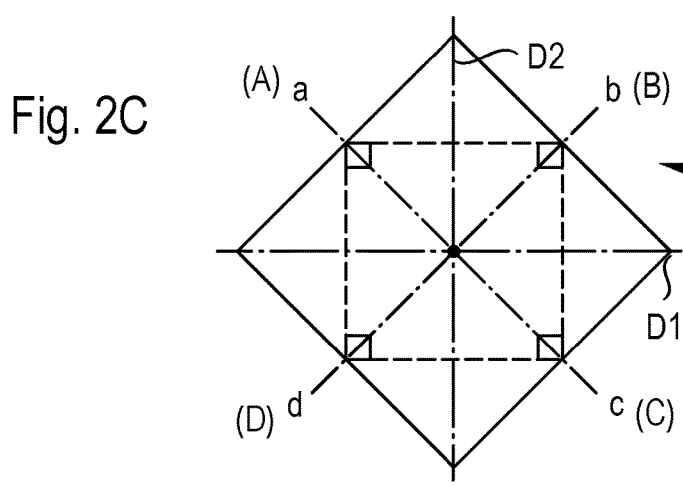

In this case, in the measurement substrate of FIGS. 1, 2A and 2C, either only the Hall elements b, c or a, d would be present, and for the measurement substrate of FIG. 3, either the Hall elements a, b or c, d. In this case, the output signals would be supplied to the four comparators K1 to K4 again, which may be why redundant information relating to the movement direction may be obtained again. If preferably the evaluation of the polarity of the voltage pulse of the Wiegand module is included again, redundant information relating to the alignment of the polarities of the permanent magnet arrangement may be obtained, too.

As can be seen from the alternatives, only at least two Hall elements may be required according to the invention in order to increase the reliability. However, the implementation of the position detector and/or the count sensor with four Hall elements may be preferred, in order to increase also the operational safety besides the reliability.

As can be seen from the preceding description, the invention provides an absolute position sensor, a position detector and a count sensor, which may have high operational safety and reliability.

The invention claimed is:

1. Position detector comprising:
   a Wiegand module, which is composed of a Wiegand wire with a coil that surrounds the Wiegand wire;
   a measurement substrate, which defines a measurement plane and on which a first Hall element and a second Hall element are arranged, wherein the Hall elements are arranged on the measurement substrate such that their areas that are sensitive to a magnetic field extend in the measurement plane or form a part of the measurement plane;
   a processing electronic system, which comprises the first and the second Hall elements and which is configured to evaluate an output signal that is output from the first Hall element and an output signal that is output from the second Hall element; and
   a permanent magnet assembly, which is movable relative to the Wiegand module and to the first and the second Hall element in one direction as well as in a direction that is opposite to said one direction;
   wherein
   upon a movement of the permanent magnet assembly in said one direction, the coil of the Wiegand module generates a voltage pulse, if a north pole or a south pole of the permanent magnet assembly is located at a first position, and upon a movement of the permanent magnet assembly in said opposite direction, the coil of the Wiegand module produces the voltage pulse, if the north pole or the south pole of the permanent magnet assembly is located at a second position that is different from the first position,
   in an autonomous mode, in which the position detector is not supplied with external energy, the first and the second Hall elements and the processing electronic system are supplied with energy, which is provided by the Wiegand module, and the first Hall element and the second Hall element are arranged such that the processing electronic system, by evaluating the output signal of the first Hall element and the output signal of the second Hall element, obtain information about whether the permanent magnet assembly moves in said one direction or in said opposite direction,
   the first Hall element and the second Hall element are arranged such that the processing electronic system, by the evaluation of the voltage pulse, the output signal of the first Hall element and the output signal of the second Hall element, obtains information about whether the north pole or the south pole is located at the first or second position, and the information about whether the permanent magnet assembly moves in said one direction or in said opposite direction, and the processing electronic system is configured to obtain the information about whether the permanent magnet assembly moves in said one direction or in said opposite direction on the one hand by providing the output signal of the first Hall element in relation with the output signal of the second Hall element, and on the other hand by providing a polarity of the voltage pulse generated by the coil in relation with at least one of the output signals of the Hall elements.

2. Position detector according to claim 1, wherein the processing electronic system is configured to obtain the information about whether the permanent magnet assembly moves in said one direction or in said opposite direction by setting the polarity of the voltage pulse generated by the coil in relation with each of the output signals of the first and the second Hall elements.

3. Position detector according to claim 1, wherein the processing electronic system is configured to output an error signal, if the information cannot be obtained.

4. Position detector according to claim 1, wherein the position detector is configured to pass over to a non-autonomous operation, in which the position detector is supplied with external energy and an energy storage of the position detector, which is configured to store electric energy, is charged with the external energy; and the energy storage is connected with the processing electronic system such that after passing over of the position detector to the autonomous mode, it supplies the processing electronic system with the stored energy within a minimum time period after the passing over, if the Wiegand module does not supply sufficient energy at a point in time within the minimum time period.

5. Position detector according to claim 1, further comprising:
a third Hall element, which is arranged on the measurement substrate and which is connected to the first Hall element such that their output signals, which indicate a magnetic field strength, are added to a sum signal, wherein the first and the third Hall elements are arranged such that, if in the autonomous mode, the north pole is at the first position after the determination of the voltage pulse, the output signal of the first Hall element corresponds to the north pole and the output signal of the third Hall element corresponds to the south pole; and
a fourth Hall element, which is arranged on the measurement substrate and which is coupled to the second Hall element such that their output signals, which indicate a magnetic field strength, are added to a sum signal, wherein the second and the fourth Hall element are arranged such that if in the autonomous mode, the north pole is at the second position after the determination of the voltage pulse, the output signal of the second Hall element corresponds to the north pole and the output signal of the fourth Hall element corresponds to the south pole.

6. Count sensor for counting the number of turns or linear displacements of an object, wherein the count sensor comprises:

a position detector according to claim 1, wherein the permanent magnet assembly is configured to be arranged at the object such that the permanent magnet assembly performs the turns or linear displacements together with the object; and a data memory for storing a value, which indicates the number of turns or of the linear displacements; wherein the processing electronic system is configured to count the number of turns or of the linear displacements of the object on the basis of the information and to store the corresponding value in the data memory.

7. Position detector comprising:
a Wiegand module, which is composed of a Wiegand wire with a coil that surrounds the Wiegand wire;
a measurement substrate, which defines a measurement plane and on which a first Hall element and a second Hall element are arranged, wherein the Hall elements are arranged on the measurement substrate such that their areas that are sensitive to a magnetic field extend in the measurement plane or form a part of the measurement plane;
a processing electronic system, which comprises the first and the second Hall elements and which is configured to evaluate an output signal that is output from the first Hall element and an output signal that is output from the second Hall element; and
a permanent magnet assembly, which is movable relative to the Wiegand module and to the first and the second Hall element in one direction as well as in a direction that is opposite to said one direction;
wherein
upon a movement of the permanent magnet assembly in said one direction, the coil of the Wiegand module generates a voltage pulse, if a north pole or a south pole of the permanent magnet assembly is located at a first position, and upon a movement of the permanent magnet assembly in said opposite direction, the coil of the Wiegand module produces the voltage pulse, if the north pole or the south pole of the permanent magnet assembly is located at a second position that is different from the first position,
in an autonomous mode, in which the position detector is not supplied with external energy, the first and the second Hall elements and the processing electronic system are supplied with energy, which is provided by the Wiegand module, and the first Hall element and the second Hall element are arranged such that the processing electronic system, by evaluating the output signal of the first Hall element and the output signal of the second Hall element, obtain information about whether the permanent magnet assembly moves in said one direction or in said opposite direction
the first Hall element and the second Hall element are arranged such that the processing electronic system, by the evaluation of the voltage pulse, the output signal of the first Hall element and the output signal of the second Hall element, obtains information about whether the north pole or the south pole is located at the first or second position, and the information about whether the permanent magnet assembly moves in said one direction or in said opposite direction, and
the processing electronic system is configured to output an error signal if the information about whether the permanent magnet assembly moves in said one direction or in said opposite direction cannot be obtained.

8. Position detector according to claim 7, wherein
the processing electronic system is configured to obtain the information about whether the permanent magnet assembly moves in said one direction or in said opposite direction on the one hand by providing the output signal of the first Hall element in relation with the output signal of the second Hall element, and on the other hand by providing a polarity of the voltage pulse generated by the coil in relation with at least one of the output signals of the Hall elements.

9. Position detector according to claim 8, wherein
the processing electronic system is configured to obtain the information about whether the permanent magnet assembly moves in said one direction or in said opposite direction by setting the polarity of the voltage pulse generated by the coil in relation with each of the output signals of the first and the second Hall elements.

10. Position detector according to claim 7,
wherein the position detector is configured to pass over to a non-autonomous operation, in which the position detector is supplied with external energy and an energy storage of the position detector, which is configured to store electric energy, is charged with the external energy; and the energy storage is connected with the processing electronic system such that after passing over of the position detector to the autonomous mode, it supplies the processing electronic system with the stored energy within a minimum time period after the passing over, if the Wiegand module does not supply sufficient energy at a point in time within the minimum time period.

11. Position detector according to claim 7,
further comprising:
a third Hall element, which is arranged on the measurement substrate and which is connected to the first Hall element such that their output signals, which indicate a magnetic field strength, are added to a sum signal, wherein the first and the third Hall elements are arranged such that, if in the autonomous mode, the north pole is at the first position after the determination of the voltage pulse, the output signal of the first Hall element corresponds to the north pole and the output signal of the third Hall element corresponds to the south pole; and a fourth Hall element, which is arranged on the measurement substrate and which is coupled to the second Hall element such that their output signals, which indicate a magnetic field strength, are added to a sum signal, wherein the second and the fourth Hall element are arranged such that if in the autonomous mode, the north pole is at the second position after the determination of the voltage pulse, the output signal of the second Hall element corresponds to the north pole and the output signal of the fourth Hall element corresponds to the south pole.

* * * * *